United States Patent [19]

Mock et al.

[11] Patent Number: 5,564,636
[45] Date of Patent: Oct. 15, 1996

[54] MILLWORK FOR A GRAIN MILL

[75] Inventors: Wolfgang Mock, Otzberg; Ralf Pigge, Homburg; Helmut Mann, Reichelsheim, all of Germany

[73] Assignee: HAWO's Kornmuhlen GmbH, Otzberg, Germany

[21] Appl. No.: 399,557

[22] Filed: Mar. 7, 1995

[30]  Foreign Application Priority Data

Mar. 8, 1994 [DE] Germany ........................ 44 07 621.5

[51] Int. Cl.$^6$ .............................. B02C 7/02; B02C 7/14
[52] U.S. Cl. ........................................ 241/261.2; 241/286
[58] Field of Search ............................ 241/261.2, 259.1, 241/286

[56]  References Cited

U.S. PATENT DOCUMENTS

| | | | |
|---|---|---|---|
| 225,374 | 3/1880 | Higginbottom et al. | 241/286 X |
| 1,629,377 | 5/1927 | Buckwalter | 241/259.1 X |
| 2,243,476 | 5/1941 | Hartmann | 241/286 X |
| 2,478,937 | 9/1949 | Niethamer | 241/286 X |
| 3,684,200 | 8/1972 | Reinhall | 241/259.1 |
| 3,901,453 | 8/1975 | Robinson | 241/259.1 |
| 4,022,388 | 5/1977 | Schnitzer | 241/246 |
| 4,039,152 | 8/1977 | Peterson | 241/245 |

FOREIGN PATENT DOCUMENTS

| | | | |
|---|---|---|---|
| 72068 | 12/1892 | Germany | 241/259.1 |
| 3535119 | 4/1987 | Germany . | |
| 3541389 | 5/1987 | Germany | 241/261.2 |
| 4326926 | 2/1995 | Germany . | |
| 91/18545 | 12/1991 | WIPO . | |

*Primary Examiner*—John Husar
*Attorney, Agent, or Firm*—Burns, Doane, Swecker & Mathis, L.L.P.

[57]  ABSTRACT

A grain mill includes upper and lower supports defining a chamber. An upper mill stone is disposed in the chamber and affixed to the upper support. A lower mill stone is disposed in the chamber beneath the upper mill stone and is driven about a vertical axis of rotation. The upper support cannot rotate relative to the lower support, but can move vertically relative thereto to adjust a grinding gap between the mill stones. Adjustment of the upper support is achieved by a rotatable adjusting ring having right and left-handed screw threads which engage respective threads of the upper and lower supports. The upper support comprises a cover member which carries the upper mill stone and a cover ring which is threadedly connected to the adjustment ring. The cover member is removable from the cover ring while the cover ring remains attached to the adjustment ring.

14 Claims, 1 Drawing Sheet

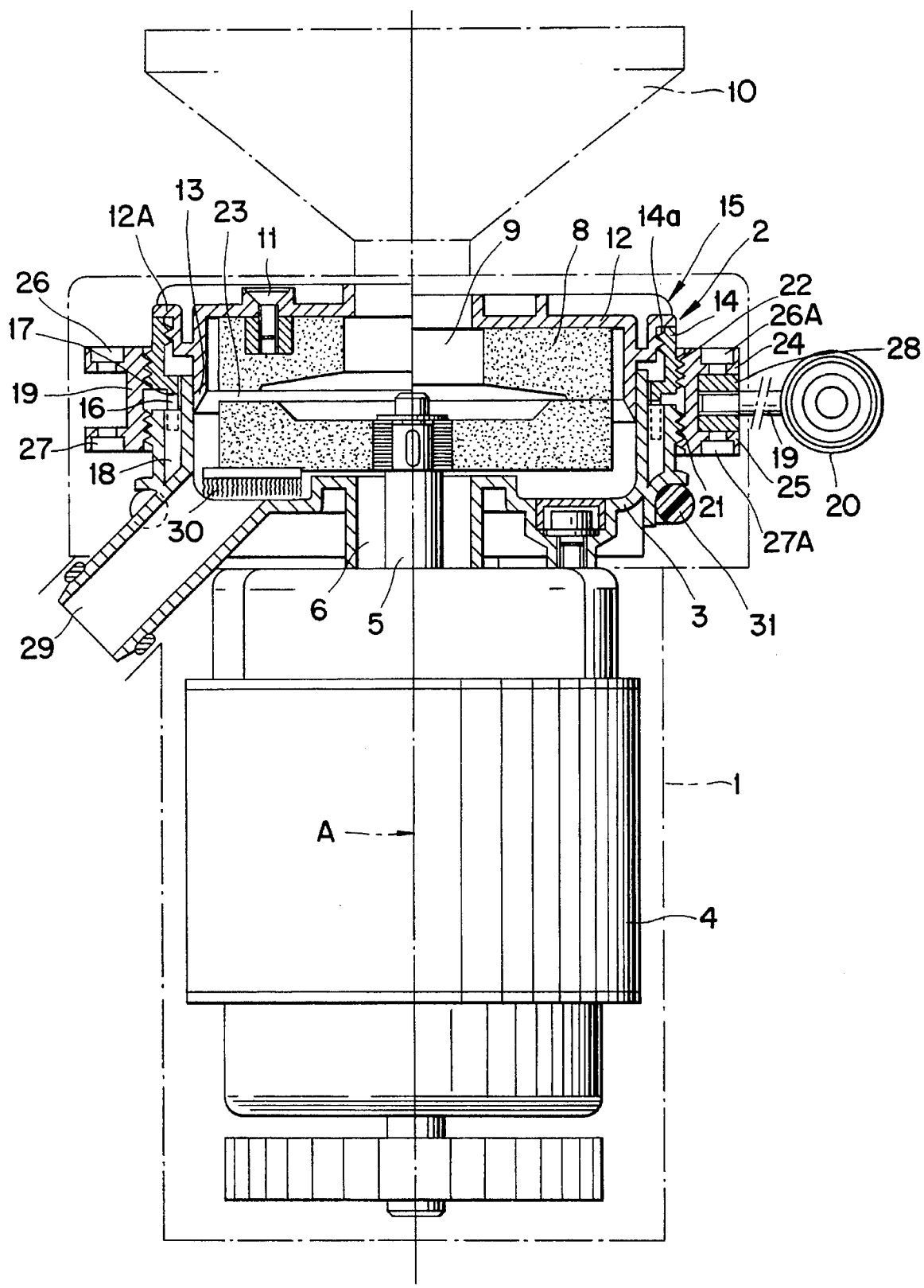

MILLWORK FOR A GRAIN MILL

BACKGROUND OF THE INVENTION

The invention relates to a millwork for a grain mill, provided with a driven lower mill stone and a fixed upper mill stone. The lower mill stone is positioned rotatably on the lower section of a millwork. The upper millstone has a central inflow opening for the mill product, and is installed in an upper mill stone support. The upper mill stone is positioned such that it can be adjusted in height (axially) but cannot be turned, whereby the upper and lower mill stones are adjustable axially relative to one another for the adjustment of the grinding gap formed between the mill stones.

Grain mills of that type serve to grind small quantities of grain mainly for immediate use. They are installed in households, but also in stores or in restaurant kitchens or for institutional use. It is important for achieving good grinding quality to assure an exact adjustment of the grinding gap. The grinding gap is to remain unchanged when in operation; an adjustment of the grinding gap is required to change the result of the grinding in a desired way.

In a known grain mill (WO 91/18545) the upper mill stone is positioned elastically, although unadjustably in the mill housing. The adjustment of the grinding gap results from an axial adjustment of the motor groove carrying the lower mill stone. For this, the use of a motor with an axially adjustable motor shaft is required.

The elastic mounting of the upper mill stone, so mounted for the purpose of damping the noise, hampers the precise axial adjustment of the grinding gap. A disassembly of the millwork, for instance for cleaning purposes, is so costly that it cannot be conducted readily by the user himself. For a known grain mill with a millwork of the type noted above (DE 35 35 119 A1, FIG. 2) the support for the upper mill stone is designed as a casing arranged axially adjustably on the mill housing. An adjustment mechanism required for the adjustment of the grinding gap and a possible means to open the millwork for cleaning purposes are not described.

In German Patent Application P 43 26 926.5, the upper mill stone support is arranged axially adjustably between the lower section of the millwork and a cover rigidly connected to the latter. The adjustment mechanism for the upper mill stone support is placed in the cover and comprises two adjustment rings in contact with a screw surface, wherein one ring is attached so that it cannot turn and the other ring is rotatably positioned and provided with an adjustment handle projecting outward. The space requirement for the adjustment mechanism is relatively large. To open the millwork, the cover with the adjustment mechanism and the upper mill stone support must be removed.

The task of the present invention is to design a millwork so that the adjustment mechanism necessary for the adjustment of the upper mill stone support requires little space and is simple to mount, and thus makes possible an adjustment of the grinding gap that is unchangeable during operation.

SUMMARY OF THE INVENTION

This problem is solved in that the upper mill stone support forms a cover for the millwork, which is conducted axially movably, but unrotatably, on the lower section of millwork, and that an outer adjustment ring, carrying an adjustment handle, is threadedly engaged with the lower section of the millwork and threadedly engaged with the upper mill stone support. The outer adjustment ring forming the adjustment mechanism represents a relatively simple one-piece part with a small space requirement. Since the adjustment ring is engaged with the lower section of the millwork and with the upper mill stone support by respective adjustment threads, a precise cant-free adjustment of the upper mill stone support relative to the lower section of the millwork is guaranteed.

The adjustment threads have opposite twists, that is to say, one is designed as a left-handed thread and the other as a right-handed thread, and form a reliable guide for the adjustment-ring so that other structures for the guiding adjustment ring are unnecessary. The connection between the stationary lower section of the millwork and the axially moveable upper mill stone support creates an interlock and is short in height, so that the provision of elastic components, which could lead to an imprecise adjustment of the grinding gap, is unnecessary. The adjustment ring serves to support the upper mill stone support on the lower section of the millwork, so that a direct connection between the upper mill stone support and the housing of the grain mill does not occur, whereby there is no transmission of vibration or noise between the upper millwork support and the housing of the grain mill. A vibration damping of the entire millwork results from an elastic support ring on the perimeter of the lower section of the millwork.

The movement of the adjustment handle can be translated in a constructive and simple way into the rotation of the adjustment ring necessary for the adjustment of the grinding gap. The adjustment handle can be fastened simply on the perimeter of the adjustment ring, through which a sufficient guiding of the adjustment handle is achieved at the same time, without special guide mechanisms being necessary. In lieu of a handle, any suitable mechanism can be provided for rotating the adjustment ring, such as a gear train driven manually or by a motor.

In accordance with the preferred embodiment of the invention it is foreseen that the upper mill stone support comprises the cover connected with the upper mill stone and a cover ring attached to the cover, which cover ring is engaged on its outer perimeter with the adjustment ring by means of an adjustment thread.

It is possible in a simple way to open the millwork, for example for cleaning purposes, by loosening the cover from the cover ring. Preferably the cover is screwed within an inner thread of the cover ring, so that it can be loosened by being unscrewed. The adjustment of the grinding gap remains unchanged by such unscrewing, because the axial relationship is not changed between the cover ring and the lower section of the millwork.

Preferably, the cover ring is mounted on the lower section of the millwork for axial movement, but is fixed against rotation. Thus, the cover ring cannot be rotated when loosening the cover.

BRIEF DESCRIPTION OF THE DRAWING

An example of an embodiment of the invention is described in detail in the following, which is depicted in the drawing. The sole FIGURE depicts a grain mill according to the invention, in vertical section.

DETAILED DESCRIPTION OF A PREFERRED EMBODIMENT OF THE INVENTION

A mill housing 1 is indicated by dotted lines. In the mill housing 1 a millwork 2 is held. The millwork 2 has a lower support section 3, onto the underside of which a motor 4 with a vertical axis is attached by screws. A motor shaft 5 defining an axis A extends upwards through a hole 6 of the lower section 3 and supports a rotatably driven lower mill stone 7.

An upper, circular mill stone 8 has a central inflow opening 9 for the product to be ground which flows in from a funnel tube 10 of the mill housing 1. The upper mill stone 8 is fastened by means of screws 11 onto cover 12. The cover 12 extends into the lower section 3 of the millwork, the cover 12 designed as a cylindrical pot with a ring 13 extending downwards like a piston and sealed against the inner wall of the lower section 3.

The cover 12 has a threading on its perimeter that is screwed in the inner thread 14a of a cover ring 14 until an upper stop shoulder 12A of the cover abuts an upper end of the cover ring 14. The cover 12, together with the cover ring 14 screwed thereon, forms an upper mill stone support 15. The upper support 15 and lower section 3 together define a chamber in which the mill stones 7, 8 are disposed. The cover ring 14 has a section 16 extending downwards and in which several guide slots are formed. The guide slots are distributed along the perimeter and extend radially and axially. The guide slots are open radially and axially. Several radial studs 18 are distributed along the perimeter of the lower section 3, each of which engages in a respective guide slot 17 of the cover ring 14. In this way, the cover ring 14 is guided on the lower section 3 such that it is axially moveable but non-rotatable.

On the outer perimeter of the millwork 2 an adjustment ring 19 is arranged, which is connected with a manual adjustment handle 20 extending radially out of the mill housing 1. The adjustment ring 19 is threadedly engaged with the lower section 3 by means of an adjustment thread 21, and is threadedly engaged with the cover ring 14 by means of an adjustment thread 22 which is axially spaced from the thread 21. The adjustment threads 21 and 22 are constructed with opposite twists, that is to say, one adjustment thread, for example the lower adjustment thread 21 is constructed as a right-handed spiral and the other thread is constructed as a left-handed spiral. Both of the adjustment threads 21, 22 can, if desired, be constructed with the same spiral height. The adjustment threads can be, for example, angular screw threads or trapezoidal threads. An axial adjustment of the upper mill stone support 15 relative to the lower section 3 is effected through the different spiral directions of the adjustment threads 21, 22 during a turning of the adjustment ring 19 by means of the adjustment handle 20. In this way, the size of the grinding gap 23 formed between the mill stones 7 and 8 is adjusted.

In the left half of the drawing a large grinding gap 23 is shown, while in the right half of the drawing a position is shown in which both mill stones 7, 8 engage one another. To attach the adjustment handle 20 to the adjustment ring 19, the adjustment ring 19 has at least one flange on its perimeter, two such flanges 24, 25 being provided in the illustrative example. The flanges are arranged at a distance from one another and are constructed with a ring of fastening holes 26, 27 which are parallel to the axis A. A fastening piece 28 into which the adjustment handle 20 is screwed, is clamped between flanges 24 and 25 by means of clamping screws 26A, 27A which are screw-threaded in respective holes 26, 27. The arrangement of fastening holes 26, 27 distributed over the perimeter of the flanges 24, 25 makes it possible to attach the adjustment handle 20 to one of various points on the perimeter of the adjustment ring 19. After assembling the upper mill stone support 15, a connection in the area of the adjustment threads 21, 22 is established by turning the adjustment ring 19 (not yet connected with the adjustment handle 20), until both of the mill stones 7, 8 touch one another. In this position, depicted at the right side of the drawing, the adjustment handle 20 is attached to the adjustment ring. When the adjustment handle 20 along with the adjustment ring 19 are then swivelled about axis A, the upper mill stone support 15 along with the mill stone 8 is raised so the grinding gap 23 can be set to the desired width.

The lower section 3 has a flow-off shaft 29 on one side, through which the ground product flows out. On the underside of the lower mill stone 7 a brush 30 is attached which conducts the ground product to the flow-off shaft 29 when the lower mill stone 7 turns. When the millwork 2 is to be opened, for example for cleaning purposes, the cover 12 is unscrewed from the covering ring 14 after opening the mill housing 1. Since the cover ring 14 maintains its position during this unscrewing, the same adjustment of the grinding gap as existed before the disassembly, is automatically re-achieved upon screwing the cover 12 on again.

The millwork 2 carrying the motor 4 is positioned on the mill housing 1 over an elastic ring 31. The ring 31 dampens the vibration emanating from the millwork 2, or rather the motor 4, and largely prevents its transmission to the mill housing 1.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A grain mill for performing a grain milling operation, comprising:

a stationary lower support having a first screw thread;

an upper support mounted on said lower support for vertical adjustment relative thereto, said upper support being non-rotatable relative to said lower support during such vertical adjustment and during a grain milling operation, said upper and lower supports forming a chamber, said upper support including a second screw thread having an opposite twist with respect to said first screw thread, said first and second screw threads having a common center axis;

an upper mill stone affixed to said upper support and situated in said chamber;

a lower mill stone disposed in said chamber beneath said upper mill stone for forming a gap therebetween, a height of said gap being variable by vertical adjustment of said upper support, said lower mill stone being driven about said axis during a grinding procedure;

an adjustment ring having third and fourth screw threads joined to said first and second screw threads, respectively; and an adjusting device for rotating said adjustment ring about said axis relative to said upper and lower supports to vertically adjust said upper support in the absence of rotation thereof.

2. The grain mill according to claim 1, wherein said upper support includes a cover member and a cover ring removably attached to said cover member, said upper mill stone affixed to said cover member, and said cover ring including said second screw thread.

3. The grain mill according to claim 2, wherein said cover member is connected to said cover ring by a threaded connection arranged coaxially with respect to said center axis.

4. The grain mill according to claim 3, wherein said threaded connection comprises an external fifth screw thread on said cover member, and an internal sixth screw thread on said cover ring.

5. The grain mill according to claim 4, wherein said first and second screw threads are external screw threads, and said third and fourth screw threads are internal screw threads.

6. The grain mill according to claim 2, including stop means limiting the amount of downward movement of said cover member relative to said cover ring.

7. The grain mill according to claim 2, wherein said cover ring includes a downwardly open slot which receives a stud on said lower support to prevent relative rotation between said upper and lower supports while permitting vertical adjustment of said upper support relative to said lower support.

8. The grain mill according to claim 7, wherein there is a plurality of said slots and a corresponding plurality of said studs.

9. The grain mill according to claim 1, wherein said first and second screw threads are external screw threads, and said third and fourth screw threads are internal screw threads.

10. The grain mill according to claim 1, wherein said adjusting means includes a manually movable handle operatively to said adjustment.

11. The grain mill according to claim 10, wherein said adjustment ring includes a plurality of mounting sites around its outer periphery for selectively receiving said handle.

12. The grain mill according to claim 11, wherein said adjustment ring includes an external flange extending around its outer periphery, said flange including a plurality of holes spaced apart around said outer periphery at respective ones of said mounting sites, said holes adapted to receive screws for connection with said handle.

13. The grain mill according to claim 12, wherein said holes have axes oriented parallel to said axis of said first and second screw threads.

14. The grain mill according to claim 13, wherein said flange constitutes a first flange, and further including a second flange on said adjustment ring spaced vertically from said first flange, said mounting sites disposed between said first and second flanges, said second flange having holes aligned with respective ones of said holes in said first flange for receiving screws connectable with said handle.

\* \* \* \* \*